UNITED STATES PATENT OFFICE.

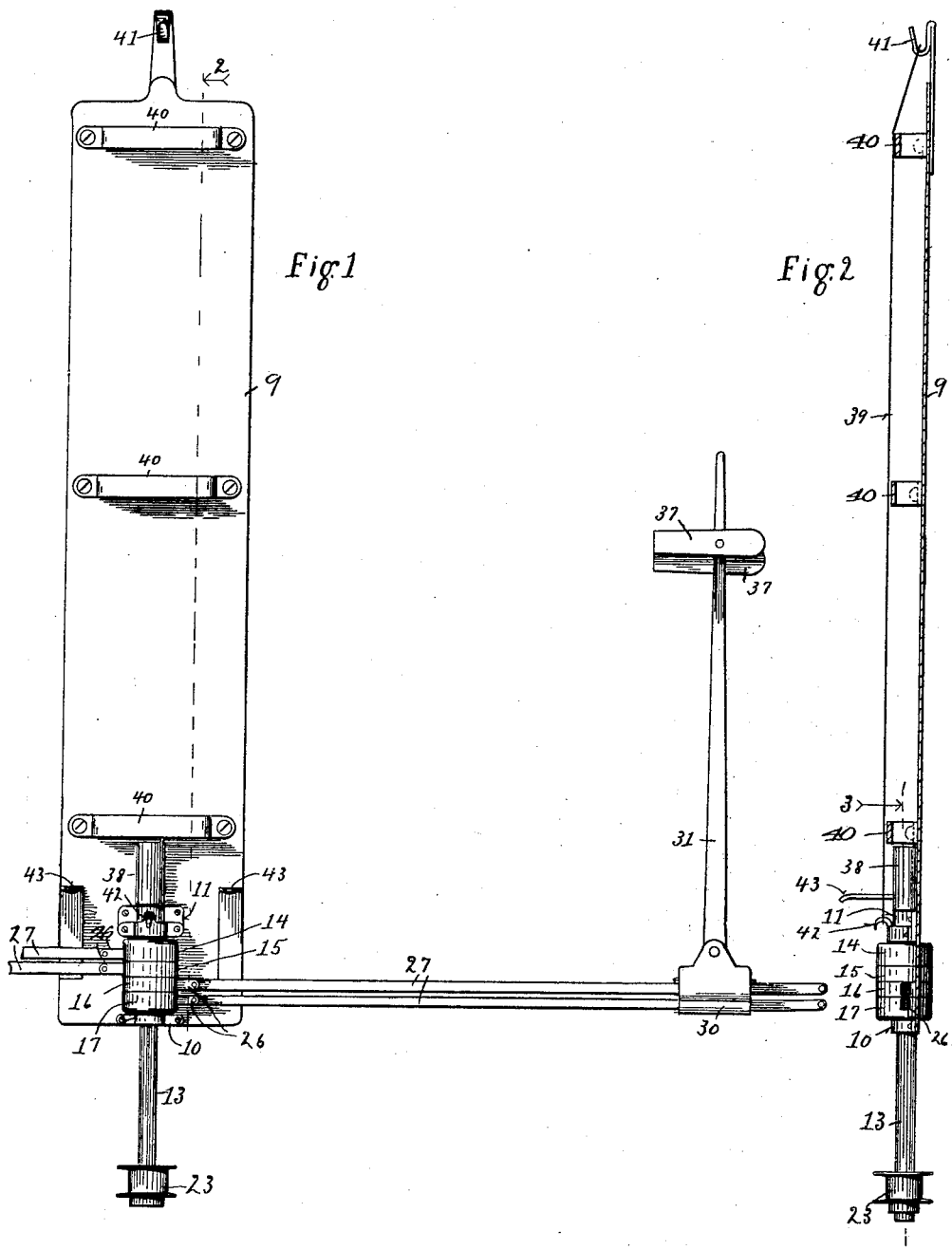

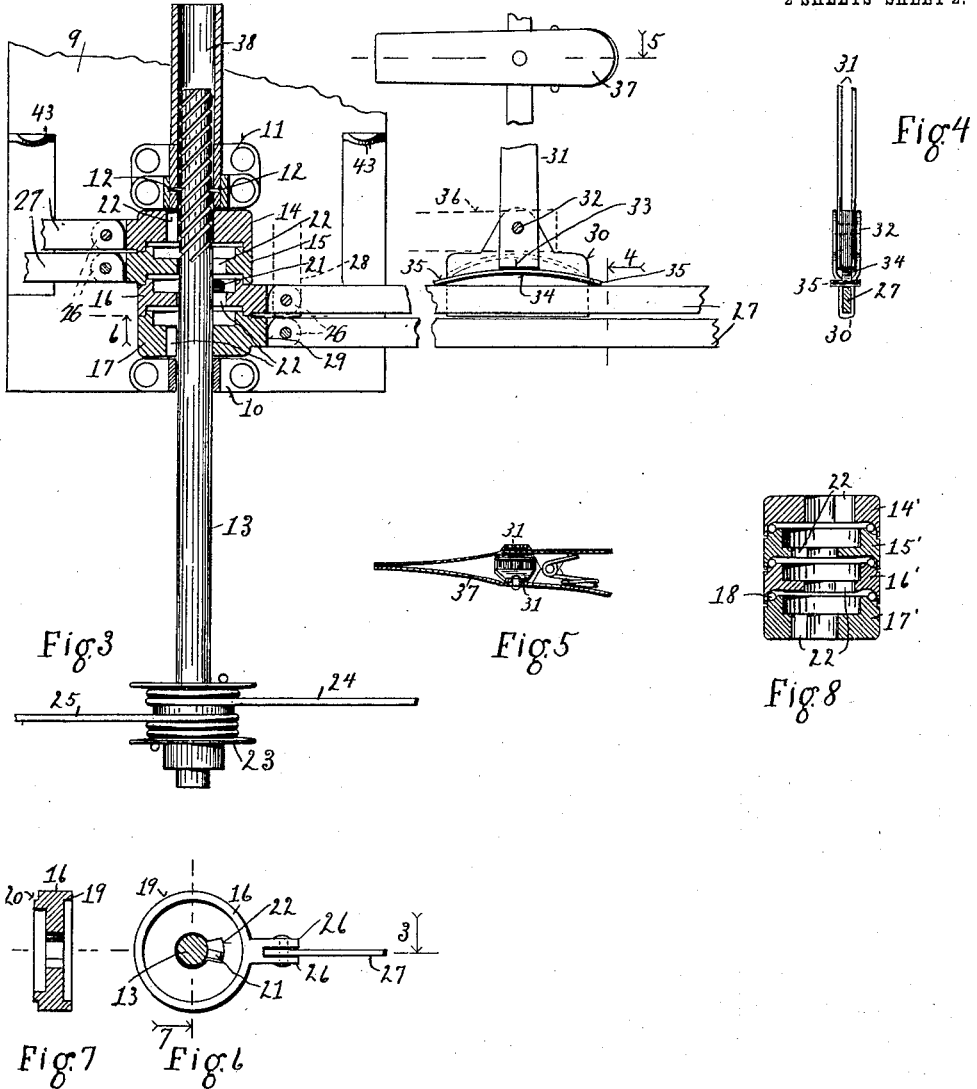

JACOB W. BOLTZ, OF TOPEKA, KANSAS.

MUSIC-LEAF TURNER.

1,067,398.  Specification of Letters Patent.  Patented July 15, 1913.

Application filed April 25, 1912. Serial No. 693,060.

*To all whom it may concern:*

Be it known that I, JACOB W. BOLTZ, a citizen of the United States, residing at Topeka, in the county of Shawnee and State of Kansas, have invented certain new and useful Improvements in Music-Leaf Turners, of which the following is a specification.

The object of my invention is to provide a simple, efficient, durable, and economical music leaf turner, that is simple in operation and not likely to get out of order.

It comprises a stationary frame in which is mounted a threaded shaft, the thread or threads of the shaft engaging a pin or pins in the frame so that the shaft moves lengthwise as it is rotated, a series of hubs mounted on the shaft, each hub carrying an arm, the webs of the hubs being spaced apart from each other and each having a key-way, and a key secured to the shaft and adapted to engage in said key-ways as the shaft is rotated, so as to turn said hubs and the respective arms a half-turn each in succession.

My invention further relates to the details of construction of the shaft, frame, and hubs; also to the details of the arms, as will hereinafter be more fully set forth.

In the drawings accompanying and forming part of this specification and in the description of the drawings, I have shown my invention in its preferred form, and have shown what I deem to be the best mode of applying the principles thereof; but it is to be understood that, within the scope of the appended claims, I contemplate changes in form, proportions, and materials, the transposition of parts, and the substitution of equivalent members, without departing from the spirit of my invention.

Figure 1 is an elevation of a music leaf turner made in accordance with the principles of my invention, two of the arms being broken away in part. Fig. 2 is a sectional elevation through the line 2 in Fig. 1. Fig. 3 is an enlarged sectional elevation of the principal operating mechanisms on the line 3 in Figs. 2, 6, and 7. Fig. 4 is a view of the means for attaching the upwardly extending fingers to the arm, on the line 4 in Fig. 3. Fig. 5 is a sectional view of the clasp on the line 5 in Fig. 3. Fig. 6 is a face view of one of the hubs, showing also the shaft, key, and part of the arm, taken approximately on line 6 in Fig. 3. Fig. 7 is a sectional view of the hub on the line 7 in Fig. 6. Fig. 8 is a sectional elevation of the hubs with ball bearings therebetween.

Similar reference characters indicate similar parts throughout the several views.

9 is a plate of any suitable size, shape, and material, in the lower end of which are two bearings 10 and 11, the latter of which has one or two pins 12, 12 adapted to engage in the thread or threads of a shaft 13, which is mounted on said bearings.

14, 15, 16, and 17 are a number of hubs mounted loosely in succession on said shaft between the two bearings, said bearings being rotatable on the shaft and in the frame but having no movement in the frame lengthwise of the shaft, their engaging faces having ribs 19 and grooves 20.

21 is a key secured to the shaft, and 22, 22 are key-ways in the webs of the respective hubs for the reception of the key. As shown in the drawings the webs are spaced apart from each other, preferably a distance slightly wider than the key, and the key-ways are wider than the thickness of the key; also it should be noted that the threads are so related to the webs of the hubs that a half-turn of the shaft causes the shaft to be moved lengthwise a distance equal to the distance from center to center of adjacent hubs. For instance, assuming the hubs to be one-quarter inch thick, the thread should be two-to-the-inch, so that a half turn of the shaft will move the shaft lengthwise from one hub to the next hub, in similar positions with respect to the planes of the respective hubs. If the shaft be turned, from position shown in Fig. 3, to the right, the key will enter the key-way in hub 15 and during a half-turn will pass through said key-way while turning that hub with it, and will be released therefrom at the end of the half-turn. Continuing turning to the right, the hub 14 will be picked up for a half-turn. By turning to the left, the hubs will similarly be turned each a half-turn to the left in succession. The key strikes against the bearings at the ends of its lengthwise travel and becomes locked against further travel than through the respective hubs 14 and 17. The turning of the shaft may be effected by any suitable means, as by cords 24, 25 wound in different directions upon the sheave 23 secured to the lower end of the shaft; whereby the shaft may be turned to the right or the left by pulling the cords 24 or 25 respectively. Or the shaft may be pulled or pushed lengthwise, in which latter case, the rotary movement will automatically accompany the lengthwise movement.

Projecting from the periphery of each hub are two lugs 26 between which is pivoted an arm 27, which may be folded up parallel with the shaft, as indicated at 28, but which has a stop 29 to prevent it from falling below its outstanding position substantially at a right angle to the shaft.

30 is a bracket embracing the arm, and 31, 31 are two fingers pivoted to the bracket at 32, the lower ends of the fingers being squared, as shown at 33, and bearing against a spring 34, whose ends are enlarged and bear against the arm, as shown at 35, 35. The purpose of the enlargement is to hold the spring within the bracket. The fingers may be turned together, either inwardly or outwardly substantially parallel with the arm, as indicated at 36. The two fingers are not riveted or otherwise rigidly secured together, but each may be turned on the pivot 32 independently of the other; for instance, where it is desired to use only the finger with the clasp next described, the other finger may be turned inwardly and out of the way.

37 is a clasp of any suitable kind secured to one of the fingers, its purpose being to clasp the music leaf, especially where the leaves are short. However, the fingers themselves are preferably made of spring metal and tend naturally to bear against each other, so that the leaf may be placed between the fingers.

38 is a tube for projecting the threaded end of the shaft from view and injury.

40, 40, 40 are three supports secured to the plate about in line with the shaft for the purpose of supporting the music at the fold, and 43, 43 are two arms to prevent the sheets from slipping downward.

41 and 42 are hooks at the top and bottom respectively, and about on the center line of the plate, their purpose being that when the music is laid on the frame with the fold along the supports, a rubber band 39 may be laid over and lengthwise of the fold and secured to the hooks, for the purpose of holding the music in place while the leaves are being turned.

It will now be understood that when the music is laid upon the rack, the arms are all turned to the right, and the fingers or clasps secured to the respective leaves, the rubber band being applied as indicated. Then by intermittent operations of the shaft the leaves may be turned. It will also be noted that by turning the fingers to the position indicated by 36, and then the arms to position indicated by 28, the device may be folded up within small compass. The brackets 30 may be slipped lengthwise on each arm. They will slip easily and freely when the fingers are turned down and the tension of the spring released; and when the fingers are up-turned again, they will be held firmly against accidental slipping.

In Fig. 8 I have shown the hubs, here indicated as 14', 15', 16', and 17', with ball bearings 18 between adjacent hubs, to eliminate friction and make the device work easier and freer.

What I claim is:

1. A leaf turner having, in combination, a frame, a shaft mounted therein, a series of outwardly extending arms mounted on the shaft, means between the shaft and the arms for imparting oscillatory motion to the arms, a bracket slidably mounted on each arm, an upwardly extending finger pivoted to the bracket and having a squared end within the bracket, and a spring between said end and the arm, the squared end being on a longer radius from the pivot than the side of the finger.

2. A leaf turner having, in combination, a frame, a shaft mounted in and having screw-threaded engagement with the frame and having a key rigidly secured thereto, a series of hubs mounted loosely and successively on the shaft, each hub having a web and a key-way therein for said key, the frame being formed to hold the hubs against lengthwise movement, and the threading being of such pitch and the key and key-ways of such length that the key engages in one key-way during a half rotation of the shaft causing the hub having such key-way to make substantially a half rotation with the shaft, and the continued rotation of the shaft causes the key to pass from that key-way to the adjacent key-ways successively, turning each hub in succession a half rotation.

3. A leaf turner having, in combination, a frame, a shaft mounted in and having screw-threaded engagement with the frame and having a key rigidly secured thereto, a series of hubs mounted loosely on the shaft, the frame being formed to hold the hubs against lengthwise movement, the hubs having key-ways for said key, said key-ways being arranged alternately on diametrically opposite sides of said shaft, the screw-threading being of such pitch as to move the key through one key-way during a half rotation of the shaft, and adjacent key-ways having a clearance to permit the key, on continued rotation of the shaft, to pass from key-way to key-way successively turning each hub a half rotation.

4. A music leaf turner having, in combination, a frame, a series of supports thereon to support the music at the fold, a hook at each end of the frame in line with the supports, a shaft having threaded engagement with the frame and having bearings therein substantially in line with said supports, and said shaft having a key, a series of hubs mounted loosely on said shaft between said bearings and having no lengthwise movement between said bearings, said hubs being arranged contiguously to each other in succession, and each hub having a web and a key-way in said web for said key, said key-ways being arranged alternately on diametrically opposite sides of said shaft, and said key extending lengthwise of the shaft a distance not greater than the thickness (measured lengthwise of the shaft) of a hub, and the threading being so arranged that a half rotation of the shaft moves the shaft and key lengthwise a distance equal to such hub thickness, whereby said key, upon rotation of the shaft, engages successively in the respective key-ways and moves said hubs successively a half rotation each; an arm secured to each hub and extending outwardly therefrom, a pair of fingers secured to each arm and bearing toward each other, and a clasp secured to one of said fingers in each pair.

5. A leaf turner having, in combination, a frame, a shaft having threaded engagement with the frame and having a key, a series of hubs loosely mounted on the shaft and held by the frame against lengthwise movement and each hub having a key-way for said key, said key-ways being arranged alternately on diametrically opposite sides of the shaft, said key extending lengthwise of the shaft a distance not greater than the distance from center to center of adjacent hubs, and the threading being of a pitch one-half of which is equal to such distance from center to center of adjacent hubs, whereby said key is adapted to engage successively in the key-ways of the respective hubs as the shaft is rotated and consequently by reason of its threaded engagement with the frame moved lengthwise from hub to hub, causing each hub to make in succession a partial rotation; each hub having an outwardly-extending leaf-engaging arm.

6. A leaf turner having, in combination, a frame, a shaft mounted in and having screw-threaded engagement with the frame to give said shaft both lengthwise and rotary motion in said frame, a series of hubs mounted loosely and successively on said shaft, said frame being arranged to hold the hubs against lengthwise movement, said shaft having a key that extends lengthwise of the shaft a distance not greater than the distance from center to center of adjacent hubs, and the pitch of the screw-threading being approximately double said distance; each hub having a key-way for said key, and said key-ways being arranged alternately on diametrically opposite sides of the shaft; whereby the rotation of the shaft moves said key from hub to hub bringing the key into the key-ways successively, said key engaging in each key-way approximately during a half-turn of the shaft and thus imparting to each hub successively a half-turn.

7. A leaf turner having, in combination, a frame, a shaft mounted in and having screw-threaded engagement with the frame and having a key rigidly secured thereto, a series of hubs loosely mounted on the shaft, the frame being formed to hold the hubs against lengthwise movement, each hub having a key-way for said key, said key-ways being arranged alternately on diametrically opposite sides of the shaft, the rotation of the shaft causing lengthwise movement thereof by reason of said screw-threaded engagement with the frame and such lengthwise movement bringing the key into engagement with the respective key-ways successively, and said key and said key-ways being respectively of such lengths (measured lengthwise of the shaft) that the key engages with each key-way during substantially a half rotation of the shaft.

In testimony whereof I have affixed my signature in presence of two witnesses.

JACOB W. BOLTZ.

Witnesses:
 JOSEPH GROLL,
 OLIVER LANE.

---

Copies of this patent may be obtained for five cents each, by addressing the "Commissioner of Patents, Washington, D. C."